(12) United States Patent
Kuo et al.

(10) Patent No.: US 7,647,132 B2
(45) Date of Patent: Jan. 12, 2010

(54) METHOD AND SYSTEM FOR PROBLEM CASE PACKAGING

(75) Inventors: Wen-Chang Kuo, Hsinchu (TW); Chien-Chung Huang, Hsinchu (TW); Tien-Der Chiang, Taichung County (TW); Yi-Lin Huang, Keelung (TW); Chun Yi Chen, Hualien (TW); Dan-Ru Wang, Tainan County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 346 days.

(21) Appl. No.: 10/839,426

(22) Filed: May 5, 2004

(65) Prior Publication Data

US 2005/0251277 A1 Nov. 10, 2005

(51) Int. Cl.
*G06F 19/00* (2006.01)
(52) U.S. Cl. .................. 700/110; 702/185; 382/149; 707/104.1
(58) Field of Classification Search .................. 702/182, 702/183, 184, 185, 35, 81–84, 108, 117, 702/118; 700/95, 99, 100, 102, 108–110, 700/121, 174, 10, 74; 707/10, 100, 104.1; 382/145, 149; 345/224, 145, 149
See application file for complete search history.

(56) References Cited

U.S. PATENT DOCUMENTS

| | | | | |
|---|---|---|---|---|
| 5,591,299 A | | 1/1997 | Seaton et al. | |
| 5,889,674 A | * | 3/1999 | Burdick et al. | 700/121 |
| 6,009,421 A | * | 12/1999 | Xie et al. | 706/904 |
| 6,148,307 A | * | 11/2000 | Burdick et al. | 707/104.1 |
| 6,349,240 B2 | * | 2/2002 | Ogawa et al. | 700/121 |
| 6,459,949 B1 | * | 10/2002 | Black et al. | 700/121 |
| 6,556,949 B1 | * | 4/2003 | Lyon | 702/182 |
| 6,633,782 B1 | * | 10/2003 | Schleiss et al. | 702/183 |
| 6,775,630 B2 | * | 8/2004 | Behkami et al. | 702/81 |
| 6,859,757 B2 | * | 2/2005 | Muehl et al. | 702/184 |
| 6,885,977 B2 | * | 4/2005 | Gavra et al. | 702/185 |
| 6,922,482 B1 | * | 7/2005 | Ben-Porath | 382/149 |
| 6,965,895 B2 | * | 11/2005 | Smith et al. | 707/10 |
| 6,968,079 B2 | * | 11/2005 | Yoshikawa et al. | 382/145 |
| 7,062,081 B2 | * | 6/2006 | Shimoda et al. | 382/149 |
| 7,171,039 B2 | * | 1/2007 | Kondo et al. | 382/149 |
| 2001/0016061 A1 | * | 8/2001 | Shimoda et al. | 382/149 |
| 2002/0001404 A1 | * | 1/2002 | Yoshikawa et al. | 382/224 |
| 2003/0061212 A1 | * | 3/2003 | Smith et al. | 707/6 |
| 2004/0122859 A1 | * | 6/2004 | Gavra et al. | 707/104.1 |
| 2004/0218806 A1 | * | 11/2004 | Miyamoto et al. | 382/145 |

OTHER PUBLICATIONS

G. Kotte et al., "Diagnosis in MES of Semiconductor Manufacturing", 9 pages.

* cited by examiner

*Primary Examiner*—Charles R Kasenge
(74) *Attorney, Agent, or Firm*—Haynes And Boone, LLP

(57) ABSTRACT

A method of problem case packaging handling consists collecting manufacturing problem information from entities associated with fabrication of a semiconductor product; and distributing the manufacturing problem information into problem cases which are stored in a problem database, each problem case representing a respective manufacturing problem and being associated with manufacturing problem information related to that problem case.

18 Claims, 8 Drawing Sheets

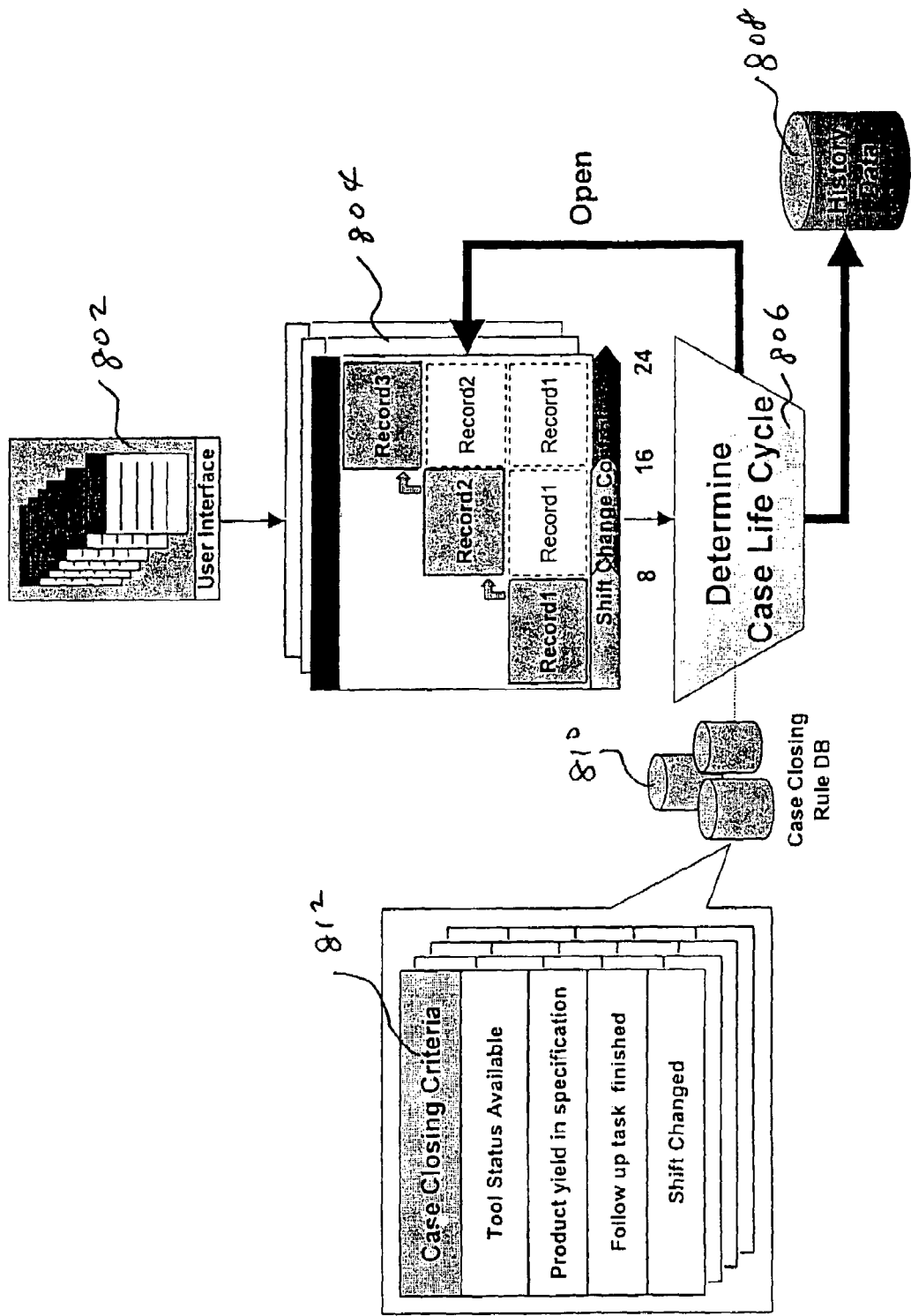

METHOD AND SYSTEM FOR PROBLEM CASE PACKAGING

BACKGROUND

The present invention relates to semiconductor fabrication facilities, and more specifically, to an electronic system and method to build, retrieve, and track knowledge for troubleshooting in maintaining semiconductor tools.

Since the invention of the integrated circuit (IC), the semiconductor industry has grown dramatically to today's ultra-large scale IC's (ULSIC's). This growth has been achieved through technological progress not only in materials, design, and processing, but also in fabrication automation. Advances in IC technology, coupled with improved mass production, provide a driving force for automation. Automation brings higher quality, shorter cycle time and lower cost, which in return drive broader IC applications and higher market demand.

Integrated circuits are produced by multiple processes in a wafer fabrication facility (fab). These processes include, for example, thermal oxidation, diffusion, ion implantation, RTP (rapid thermal processing), CVD (chemical vapor deposition), PVD (physical vapor deposition), epitaxy, etch, and photolithography. Each process requires very precise control of numerous process parameters. This requirement is typically achieved by a complex system of both hardware and software, collectively referred to as "semiconductor tools". The terms tool, machine, and equipment are sometimes used interchangeably.

When a product has a yield issue, or new failure mode, or a tool has a malfunction or problem, all manufacturing information including processing control data, production yield data, and tool control data can be used in a manual fashion to help engineers to identify, isolate and pinpoint the problem.

Currently, there is no efficient database to combine all manufacturing data together, and to dynamically organize, maintain, and relate all the data for use in efficient solving of problems relating to semiconductor processes.

BRIEF DESCRIPTION OF THE DRAWINGS

FIG. 8 is a flowchart of a method to life-time track problem cases database.

DETAILED DESCRIPTION

The following description provides a new and unique method and system for building a problem cases database for analysis and problem identification in semiconductor manufacturing.

It is understood, however, that the embodiments below are not limitations of the present disclosure, but rather are typical implementations of the disclosed method and system.

IC products are produced by multiple processes in a wafer fabrication facility. These processes include, for example, thermal oxidation, diffusion, ion implantation, RTP, CVD, PVD, epitaxy, etch, and photolithography. Each process requires very precise control and is typically achieved by a complex system referred to as semiconductor tools.

In addition to a variety of semiconductor tools, IC products have even more broad varieties of technologies, devices, and applications. Each type of device can be manufactured in dedicated wafers for most mass production. Different devices may have different sensitivities to processing and tools and may have different failure modes and effects. Moreover, different devices may have different process or tool compatibility issues. Since thousands and thousands of wafers are moving in production lines, all data related to products, tool, processing or environment could be collected through computer integrated manufacturing (CIM) system. These manufacturing data include tool alarm message, tool status, statistic process control (SPC) chart data, product processing information, product test result which includes wafer acceptance test (WAT) result and wafer level reliability test (WLR) result, wafer scrapping data, yield data, yield mapping pattern, and tool daily qualification information. All types of manufacturing data work together and are related to problems/failures. Failure modes are revealed from the above manufacturing data through analysis and processing such as correlation, commonality, exclusion, trend, and statistics. For example, if a yield issue happened in a conventional wafer fab, there is often no direct clue why, how, and where the yield issue was induced. There might be a pattern wherein, for example, this yield issue is only related to a certain process, or a certain type of tools, or a certain type of devices, or a certain type of combination, or is related to one of the above reasons. In conventional fabs all data are not properly maintained, it is hard to retrieve and use these manufacturing data efficiently to help engineers to isolate, identify, and solve problem.

The current disclosure provides a system and method to extract, organize, analyze, and relate manufacturing data/information, and assist semiconductor manufacturers to isolate, identify, and solve semiconductor manufacturing problems which may be related to process, products, tools, materials, or even to manufacturing management.

Figure 1:
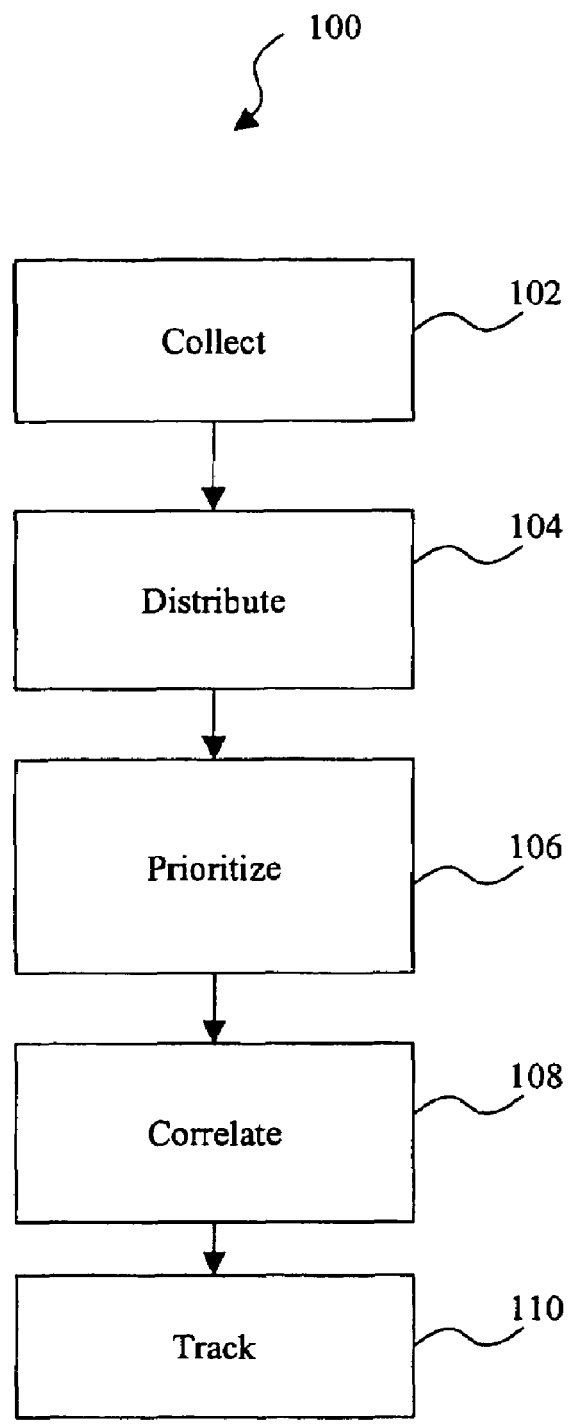
FIG. 1 is a block diagram of one embodiment of a system for building a problem cases database for semiconductor manufacturing.

Referring to FIG. 1, a method, in one embodiment, is designated with the reference numeral 100. The method begins at step 102 in which manufacturing data are collected from processing tools, products, materials, process through CIM system or database. The collected information may include tool alarm messages, tool status, product defects, out of specification (OOS) information, statistic process control (SPC) chart data, product processing information, product test results which include wafer acceptance test (WAT) results and wafer level reliability (WLR) test results, wafer scrapping data, yield data, yield mapping pattern, and daily tool qualification information. The manufacturing problems may include tool problems, such as mechanical malfunctions, inconsistent processing results, and out of specification processing parameters. The manufacturing problems may also include material problems, such as contamination, out of specification, wrong type, supplier's quality, and out of shelf life time, degradation, and out of storage condition. The manufacturing problems may also include product problems, such as non-uniformity, OOS, cracking, contamination, scratch, defects, yield issue, scrapping, reliability issue, and WAT failure. The manufacturing problems may further include process problems, such as miss processing, double processing, or cross processing by human error, and OOS. The manufacturing problems may even include manufacturing management information, such as process section, and working shift. The collected data may also include input from engineers such as problem causes, manufacturing maintenance information, special handling information, and environmental events, for example, power surging, environmental factors (contamination, for example), and even field failure information.

In step 104, all manufacturing information collected in step 102 will be packaged into problem cases. Each case represents one manufacturing problem in which all related manufacturing information is packaged together in certain data structures such that this information is associated with problems and is retrievable. The database structure could be any proper data structure. For example, each packaged case could be constructed in a tree structure in a way that a problem is the root of the tree, product types are linked to the problem root, then process flows are linked to each product type, and then process tools are linked to each process step (problem-product-process-tool). Problem case packaging could also be in other data structures such as a tree structure of problem-tool-process-product or problem-process-tool-product. In one embodiment the problem data structure is a list of problem records in which each record contains product, process, tool, and material information as components of records. If there is not enough information to determine in which process step and on which process tool a problem occurred, then the problem data structure includes a list of problem records in which each record contains product, process, tool, and material information in a way that a process component may contain all suspicious process steps to the problem and a tool component may contain all suspicious tools to the problem. The term suspicious here is used to indicate that a particular tool, process or product type is suspected of having a problem. The problem data structure is also referred to as fuzzy problem data structure.

Distribution is an evaluation processing of problem data. The distribution process uses all problem-case packaging information, sorts all records according to process or tool division, or production to find out problem distribution over process, tool, or production. Another distribution method is to use tree data structure such as process-tool-product structure, calculate problem distribution over processes, then, for all problems under that process, calculate distribution over tool, then, for all problems under that tool, calculate distribution over product.

Another distribution method addresses situations where each problem is not well identified as relating to a specific process or tool. This distribution process is based on the fuzzy problem database structure and calculates the possibility distribution over suspicious tools and processes for any given problem. First, the problems are sorted and the same types of problems are placed into one group. Then a possibility distribution over the processes and tools is determined. Then the most possible process and tool are determined. The cause of the problem is statistically narrowed and identified for remedial engineering effort.

In step 106, the distributed problems from step 104 are further prioritized according to problem distribution (related to problem frequency) and criticality (each problem is weighted by a weight parameter according to relevance and criticality). In the prioritizing step, prioritizing rules are applied to the process. The prioritizing rules prioritize all problem symptoms. For example, a wafer scrape issue may be more serious than a wafer yield issue, and a wafer yield issue may be more serious than a tool alarm. A relevant tool alarm may be more serious than a irrelevant tool alarm, and so on. As one of the results of the prioritizing process or step 106, irrelevant information can be dumped from a packaged problem database. The results of prioritizing can be used to guide manufacturing effort to focus on a certain tool, process, material, product, or manufacturing group.

In step 108, an information correlation process is carried out for all problems. A correlation process is an effective approach for analyzing problems. Correlation rules are preset and can be applied to correlation processing. In correlation processing, two parameters are related quantitatively. For example, production information could be correlated with an alarm message. Alternatively an alarm message could be correlated to tool status. The correlation process provides information or answers to the questions such as: 1) Are all problems in the metal area strongly related to sputtering tool II?; 2) Are all contamination issues related to a scrubbing process?; and 3) Are most cracking issues related to certain products, certain tools, or certain materials.

In step 110, all real problem cases are tracked for further evaluation over case life time. The tracking process may use information such as testing data, product yield data, tools status, or other follow-up information. The tracking process evaluates if each case is a real problem case, how each case should be categorized, and notes whether a particular problem is related to a certain process, product, tool, or material. The tracking process or step modifies problem cases with more accurate and reliable information, adds follow-up information such as product yield, tool status, and notes if a case is closed. Each case may be labeled by one parameter or several parameters such as criticality, priority, or/and efficiency. All tracking results are incorporated into a problem case database. The system will track each case to determine and label if the tracked case could be closed according to a case-closing rule (criterion). The rule may depend on the problem of each case. For example, a case-closing rule for a tool alarm problem may include that the alarm doesn't happen again within specific period of time and that status of the alarming tool is changed from a non-available status to an available status after the problem case is opened.

Figure 2:
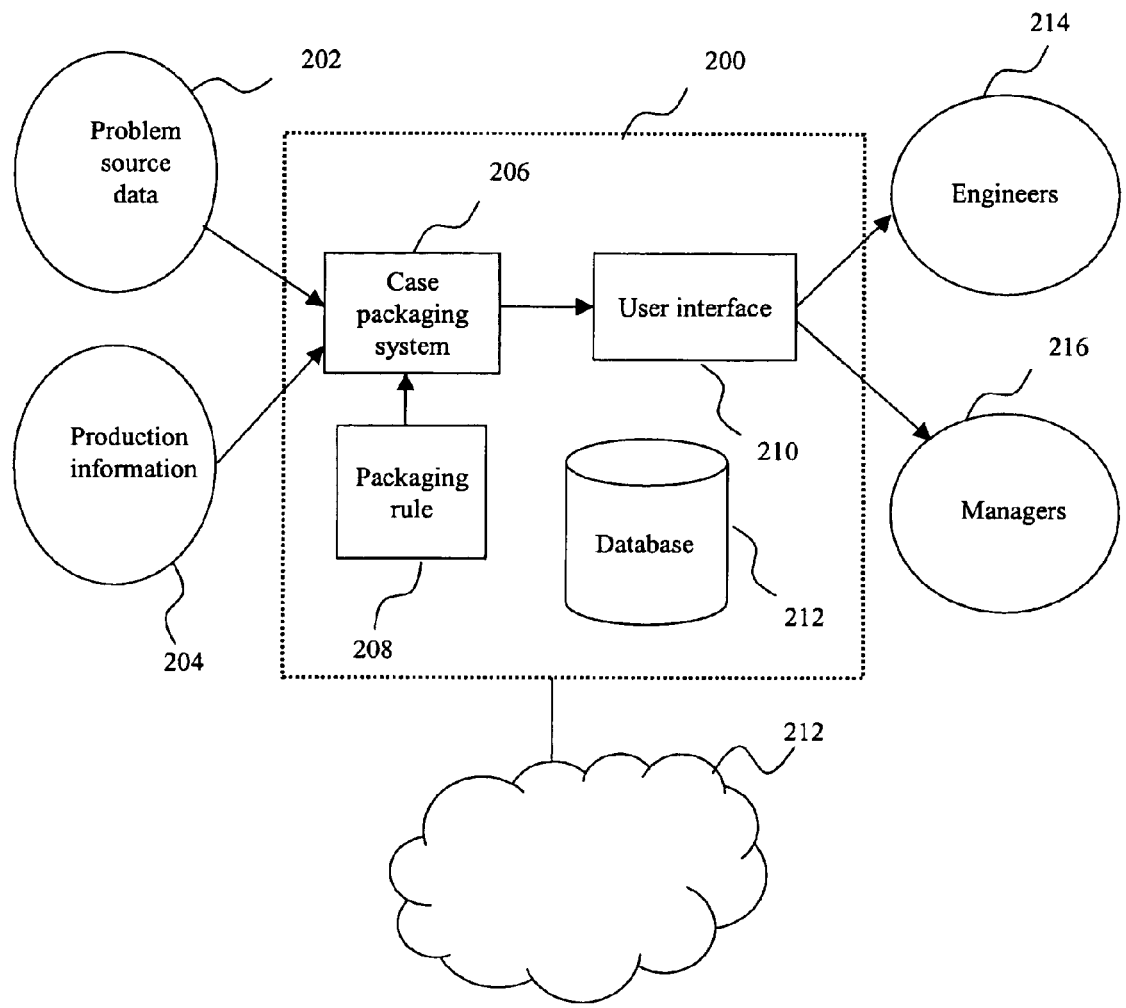
FIG. 2 is a block diagram of problem case system used within the virtual fab of FIG. 3 or the virtual fab of FIG. 4.

Referring to FIG. 2, a problem case system 200, within which the method 100 of FIG. 1 may be performed, according to one embodiment of the present disclosure, is illustrated. System 200 includes a case packaging system 206, user interface 210, packaging rule 208, and a database 212. Users including engineers 214 and managers 216 are connected to the system through user interface 210. Problem source data 202 and production information 204 are connected to system 200 through case packaging system 206 to provide input information. Case packaging system 206 collects problem case data and implements method 100 of FIG. 1 including distribution, prioritizing, correlation, and tracking. User interface 210 provides an interface between problem case system 200 and users such as engineers 214 and managers 216 who would use the problem case system for help in manufacturing problem handling including prioritizing, correlation, and isolation. Packaging rule 208 contains a set of preset rules to guide how to package all problem cases. For example, what are the criteria to pick up related information. Packaging rules can be modified and dynamically maintained.

Database 212 can include a set of packaged problem cases which receive problem case data from data sources 202 and 204. Database 212 is manipulated and maintained by case packaging system 206, and is retrieved and used by users including engineers 214 and managers 216. The database structure can be a proper structure which includes tree structure problem-product-process-tool, problem-tool-process-product, or problem-process-tool-product, on only a list of problem records in which each record contains product, process, tool, and material information as components of records, or fuzzy problem data structure. Database 212 could further include analysis rules databases to be applied to the data analysis such as distribution, priority, correlation, and tracking. These rules databases are preset and dynamically maintained, and may include tool and organization mapping databases, problem priority databases, information correlation databases, and case closing rule databases.

Figure 3:
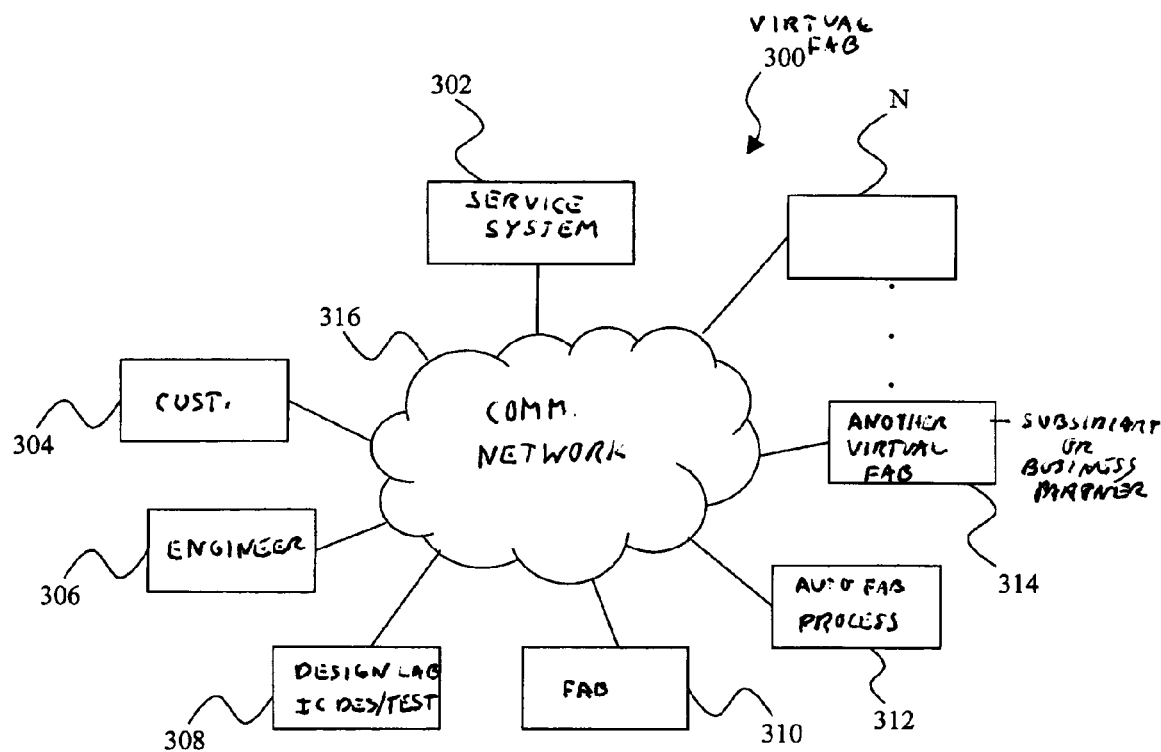
FIG. 3 is a block diagram of a virtual fabrication system, within which the method in FIG. 1 is performed.

Problem case system 200 is connected to a network and so also connected to a virtual fab 300 of FIG. 3. Problem case system 200 can also be a component of a virtual fab 300. Further, engineers 214 and managers 216 can be connected to problem case system 200 through the virtual fab, or could even be a part of the virtual fab, and could not only retrieve the database 212 and but also feedback information to the database such as feedback tracking information to update each problem case. Problem source data 202 and production information 204 can be connected to the problem case system 200 through the virtual fab, or could even be a part of the virtual fab. Problem source data may include all manufacturing problems such as tool problems including mechanical malfunction, inconsistent processing result, out of specification processing parameter; material problems including contamination, out of specification, wrong type, supplier's quality, out of shelf life time, degradation, and out of storage condition; product problems including non-uniformity, OOS, cracking, contamination, scratch, defects, yield issue, scrapping, reliability issue, and WAT failure; and process problems including miss processing, double processing, or cross processing by human error, and OOS; or even manufacturing management information such as process section and working shift. Production information 204 may include all related information from production such as production work in process (WIP), statistical process control (SPC), production portfolio, production wafer level reliability test result, WAT test result, processing time, waiting, or queued time, and wafer manufacturing history. Wafer manufacturing history includes such information as 1) on which tool and when the wafer was processed; 2) the tool condition at that time; 3) which lots are neighbor lots in that process and 4) what are real time temperature, pressure, and gas flow in that process, and so on. All data from both problem source data 202 and production information 204 can be collected through a CIM system or manufacturing execution system (MES) system as a part of the virtual fab 300.

Referring now to FIG. 3, a virtual IC fabrication system (a "virtual fab") 300, to which the system 200 of FIG. 2 may be connected, is illustrated. The virtual fab 300 includes a plurality of entities 302, 304, 306, 308, 310, 312, 314, . . . , N that are connected by a communications network 316. The network 316 may be a single network or may be a variety of different networks, such as an intranet and the Internet, and may include both wireline and wireless communication channels.

In the present example, the entity 302 represents a service system for service collaboration and provision, the entity 304 represents a customer, the entity 306 represents an engineer, the entity 308 represents a design/laboratory (lab) facility for IC design and testing, the entity 310 represents a fabrication (fab) facility, and the entity 312 represents a process (e.g., an automated fabrication process), and the entity 314 represents another virtual fab (e.g., a virtual fab belonging to a subsidiary or a business partner). Each entity may interact with other entities and may provide services to and/or receive services from the other entities.

For purposes of illustration, each entity 302-312 may be referred to as an internal entity (e.g., an engineer, customer service personnel, an automated system process, a design or fabrication facility, etc.) that forms a portion of the virtual fab 300 or may be referred to as an external entity (e.g., a customer) that interacts with the virtual fab 300. It is understood that the entities 302-312 may be concentrated at a single location or may be distributed, and that some entities may be incorporated into other entities. In addition, each entity 302-312 may be associated with system identification information that allows access to information within the system to be controlled based upon authority levels associated with each entities identification information.

The virtual fab 300 enables interaction among the entities 302-312 for the purpose of IC manufacturing, as well as the provision of services. In the present example, IC manufacturing includes receiving a customer's IC order and the associated operations needed to produce the ordered ICs and send them to the customer, such as the design, fabrication, testing, and shipping of the ICs.

One of the services provided by the virtual fab 300 may enable collaboration and information access in such areas as design, engineering, and logistics. For example, in the design area, the customer 304 may be given access to information and tools related to the design of their product via the service system 302. The tools may enable the customer 304 to perform yield enhancement analyses, view layout information, and obtain similar information. In the engineering area, the engineer 306 may collaborate with other engineers using fabrication information regarding pilot yield runs, risk analysis, quality, and reliability. The logistics area may provide the customer 304 with fabrication status, testing results, order handling, and shipping dates. It is understood that these areas are exemplary, and that more or less information may be made available via the virtual fab 300 as desired.

Another service provided by the virtual fab 300 may integrate systems between facilities, such as between the design/lab facility 308 and the fab facility 310. Such integration enables facilities to coordinate their activities. For example, integrating the design/lab facility 308 and the fab facility 310 may enable design information to be incorporated more efficiently into the fabrication process, and may enable data from the fabrication process to be returned to the design/lab facility 310 for evaluation and incorporation into later versions of an IC. The process 312 may represent any process operating within the virtual fab 300.

Figure 4:
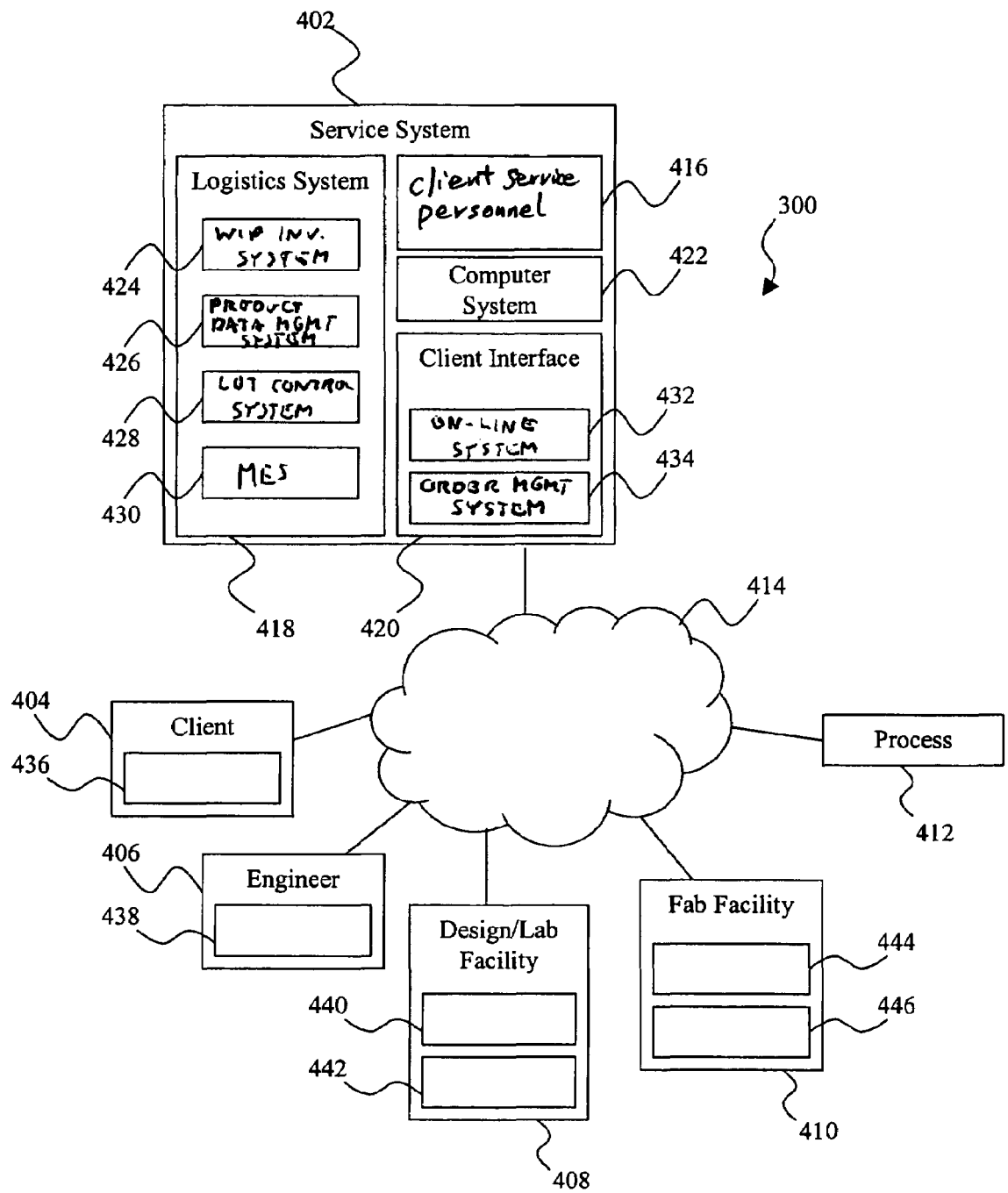
FIG. 4 is a block diagram of a virtual fab in one embodiment, to illustrate one possible implementation of the virtual fab in FIG. 3.

Referring now to FIG. 4, in another embodiment, a virtual fab 400 illustrates one possible implementation of the virtual fab 300 of FIG. 3. The virtual fab 400 includes a plurality of entities 402, 404, 406, 408, 410, and 412 that are connected by a communications network 414. In the present example, the entity 402 represents a service system, the entity 404 represents a customer, the entity 406 represents an engineer, the entity 408 represents a design/lab facility for IC design and testing, the entity 410 represents a fab facility, and the entity 412 represents a process (e.g., an automated fabrication process). Each entity may interact with other entities and may provide services to and/or receive services from the other entities.

The service system 402 provides an interface between the customer and the IC manufacturing operations. For example, the service system 402 may include customer service personnel 416, a logistics system 418 for order handling and tracking, and a customer interface 420 for enabling a customer to directly access various aspects of an order.

The logistics system 418 may include a work in progress (WIP) inventory system 424, a product data management system 426, a lot control system 428, and a manufacturing execution system (MES) 430. The WIP inventory system 424 may track working lots using a database (not shown). The product data management system 426 may manage product data and maintain a product database (not shown). The product database could include product categories (e.g., part, part numbers, and associated information), as well as a set of process stages that are associated with each category of products. The lot control system 428 may convert a process stage to its corresponding process steps.

The MES 430 may be an integrated computer system representing the methods and tools used to accomplish production. In the present example, the primary functions of the MES 430 may include collecting data in real time, organizing and storing the data in a centralized database, work order management, workstation management, process management, inventory tracking, and document control. The MES 430 may be connected to other systems both within the service system 402 and outside of the service system 402. Examples of MES systems 430 include Promis™ (a product of Brooks Automation Inc. of Massachusetts), Workstream™ (a product of Applied Materials, Inc. of California), Poseidon™ (a product of IBM Corporation of New York), and Mirl-MES™ (a product of Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 430 may include such information as a process step sequence for each product.

The customer interface 420 may include an online system 432 and an order management system 434. The online system 432 may function as an interface to communicate with the customer 404, other systems within the service system 402, supporting databases (not shown), and other entities 406-412. The order management system 434 may manage client orders and may be associated with a supporting database (not shown) to maintain client information and associated order information.

Portions of the service system 402, such as the customer interface 420, may be associated with a computer system 422 or may have their own computer systems. In some embodiments, the computer system 422 may include multiple computers (FIG. 4), some of which may operate as servers to provide services to the customer 404 or other entities. The service system 402 may also provide such services as identification validation and access control, both to prevent unauthorized users from accessing data and to ensure that an authorized customer can access only their own data.

The customer 404 may obtain information about the manufacturing of its ICs via the virtual fab 400 using a computer system 436. In the present example, the customer 404 may access the various entities 402, 406-412 of the virtual fab 400 through the customer interface 420 provided by the service system 402. However, in some situations, it may be desirable to enable the customer 404 to access other entities without going through the customer interface 420. For example, the customer 404 may directly access the fab facility 410 to obtain fabrication related data.

The engineer 406 may collaborate in the IC manufacturing process with other entities of the virtual fab 400 using a computer system 438. The virtual fab 400 enables the engineer 406 to collaborate with other engineers and the design/lab facility 408 in IC design and testing, to monitor fabrication processes at the fab facility 410, and to obtain information regarding test runs, yields, etc. In some embodiments, the engineer 406 may communicate directly with the customer 404 via the virtual fab 400 to address design issues and other concerns.

The design/lab facility 408 provides IC design and testing services that may be accessed by other entities via the virtual fab 400. The design/lab facility 408 may include a computer system 440 and various IC design and testing tools 442. The IC design and testing tools 442 may include both software and hardware.

The fab facility 410 enables the fabrication of ICs. Control of various aspects of the fabrication process, as well as data collected during the fabrication process, may be accessed via the virtual fab 400. The fab facility 410 may include a computer system 444 and various fabrication hardware and software tools and equipment 446. For example, the fab facility 410 may include an ion implantation tool, a chemical vapor deposition tool, a thermal oxidation tool, a sputtering tool, and various optical imaging systems, as well as the software needed to control these components.

The process 412 may represent any process or operation that occurs within the virtual fab 400. For example, the process 412 may be an order process that receives an IC order from the customer 404 via the service system 402, a fabrication process that runs within the fab facility 410, a design process executed by the engineer 406 using the design/lab facility 408, or a communications protocol that facilities communications between the various entities 402-412.

It is understood that the entities 402-412 of the virtual fab 400, as well as their described interconnections, are for purposes of illustration only. For example, it is envisioned that more or fewer entities, both internal and external, may exist within the virtual fab 400, and that some entities may be incorporated into other entities or distributed. For example, the service system 402 may be distributed among the various entities 406-410.

Figure 5:
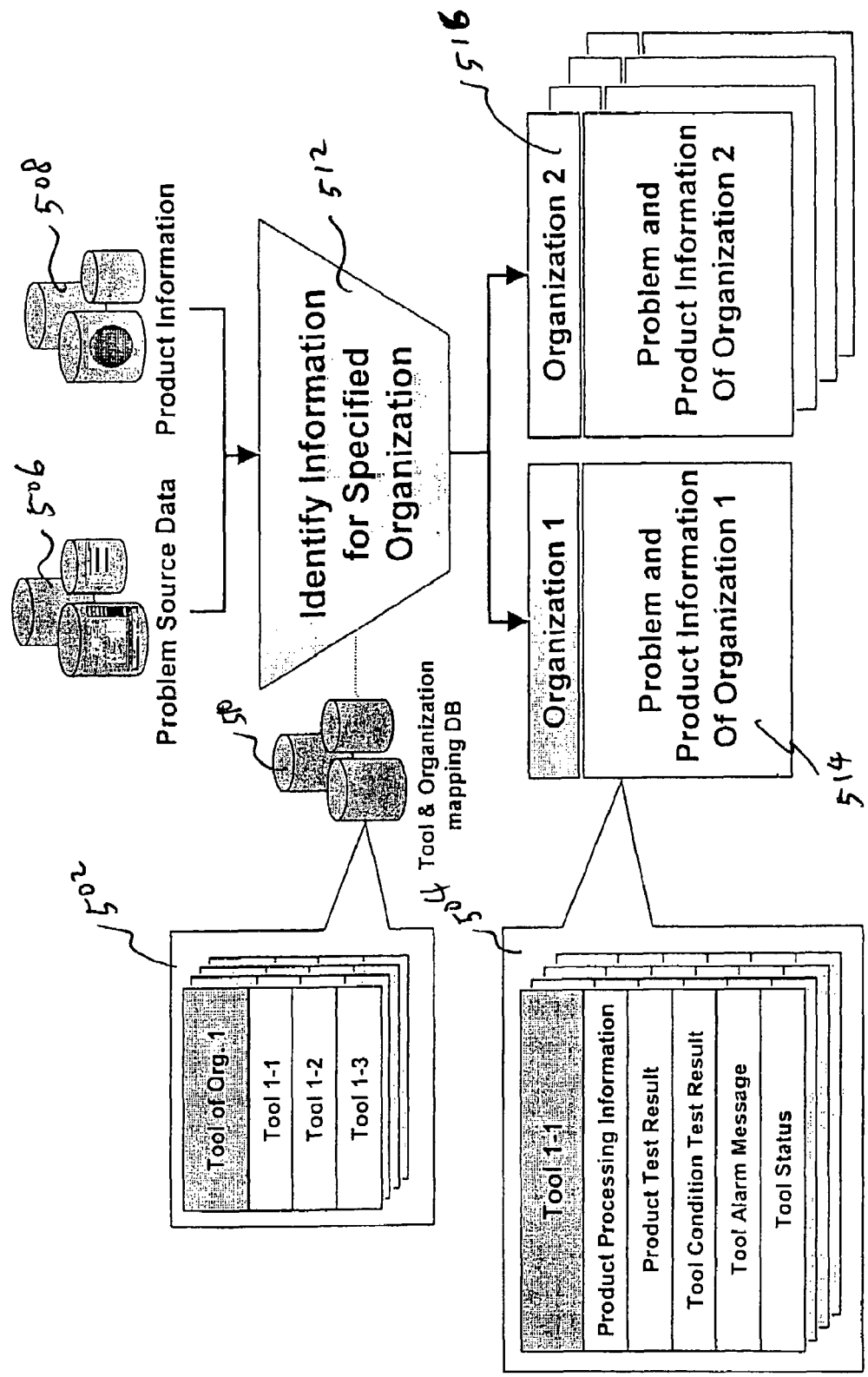
FIG. 5 is a flowchart of a method to collect data and analyze for distribution of problem cases.

Referring to FIG. 5, a method of distribution, in another embodiment, performed in the system 200 of FIG. 2, is described. The distribution process would be for problem distribution over organizations. Organizations could include photolithography group, thin film group, etch group, diffusion group, and packaging group. Here only organization One 514 and organization Two 516 are given for exemplary purpose. Each organization could be responsible for and in charge of a set of tools.

Tool and organization mapping database 510 could include a tree structure database which lists all organization. Each organization has a set of tools associated with. For example, tools of the organization one is one of data records in the tool and organization mapping database 510. The organization one tools 502 could include tool 1-1, tool 1-2, and tool 1-3.

Problem source data 506 and production information 508 could be collected. Problem source data 506 may include all manufacturing problems such as tool problems, material problems, product problems, and process problems, and even manufacturing management information. Product information 508 may include all related information from production such as WIP, SPC, production wafer level reliability test results, WAT test results, processing time, queued time, and wafer manufacturing history.

Then collected problem information and tool organization information will be processed to calculate the problem distribution over organization 512. For example, any problem related to tool 1-2 would be related to the organization one. In this step, all information for a given organization is identified.

In the next step, the identified information is organized, grouped, and presented to user, such as problem and product information for the organization one 514 and problem and product information for the organization two 516 as examples. The identified problem data for each organization could further be structured as a tree structure and comprise all tools such as tool 1-1, tool 1-2, and tool 1-3 for the organization one. And for the tool 1-1, associated are all related problem and product information such as product processing information, product test information, tool condition test result, tool alarm message, and tool status.

Figure 6:
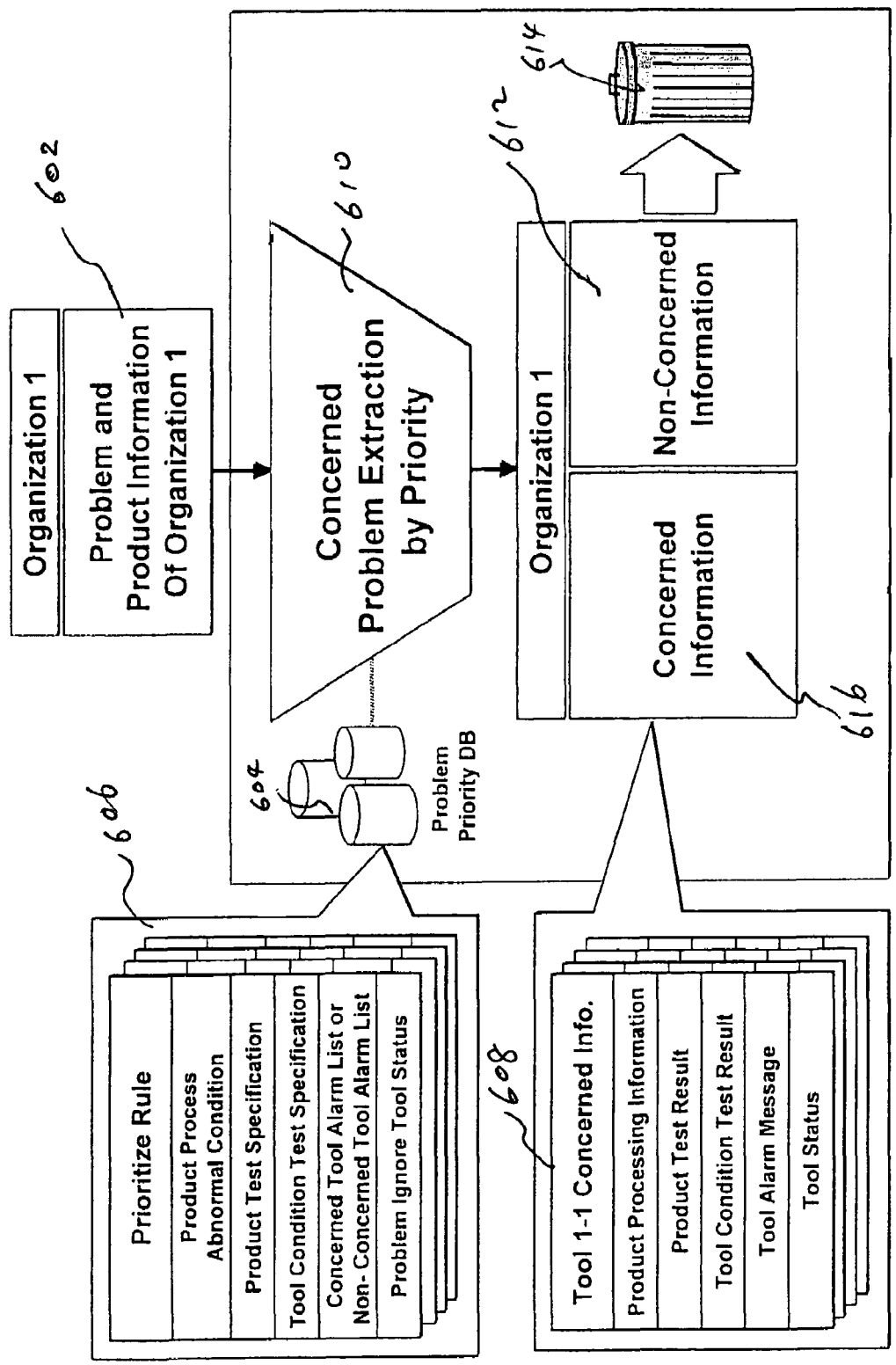
FIG. 6 is a flowchart of a method to prioritize problem cases database.

Referring to FIG. 6, a method of prioritizing, in another embodiment, performed in the system 200 of FIG. 2, is described.

As an example, all identified problem information to the organization one 602, as procured by the method of FIG. 5, will go further for prioritizing process.

Problem priority database 604 is preset and dynamically maintained. In one embodiment, priority rules list all problem types in an order according to intended priority. A problem associated with higher priority problem type could be assigned as a high priority. Alternatively, priority rules can include a set of criteria to determine if a problem is relevant or irrelevant. In one embodiment, such priority rules 606 can include criteria such as product process abnormal condition, product test specification, tool condition test specification, relevant tool alarm list or irrelevant tool alarm list, and problem ignore tool status. Any case filtered out by the criteria would be considered as irrelevant problem case.

The problem and product information of organization one 602 will be prioritized according to problem priority database 604. After priority process 610, all relevant problems will be extracted from the problem and product information 602. The rest of the problems would be treated as irrelevant problems 612, and would be disregarded 614. All relevant problems will be retained for user information or for further processing.

Figure 7:
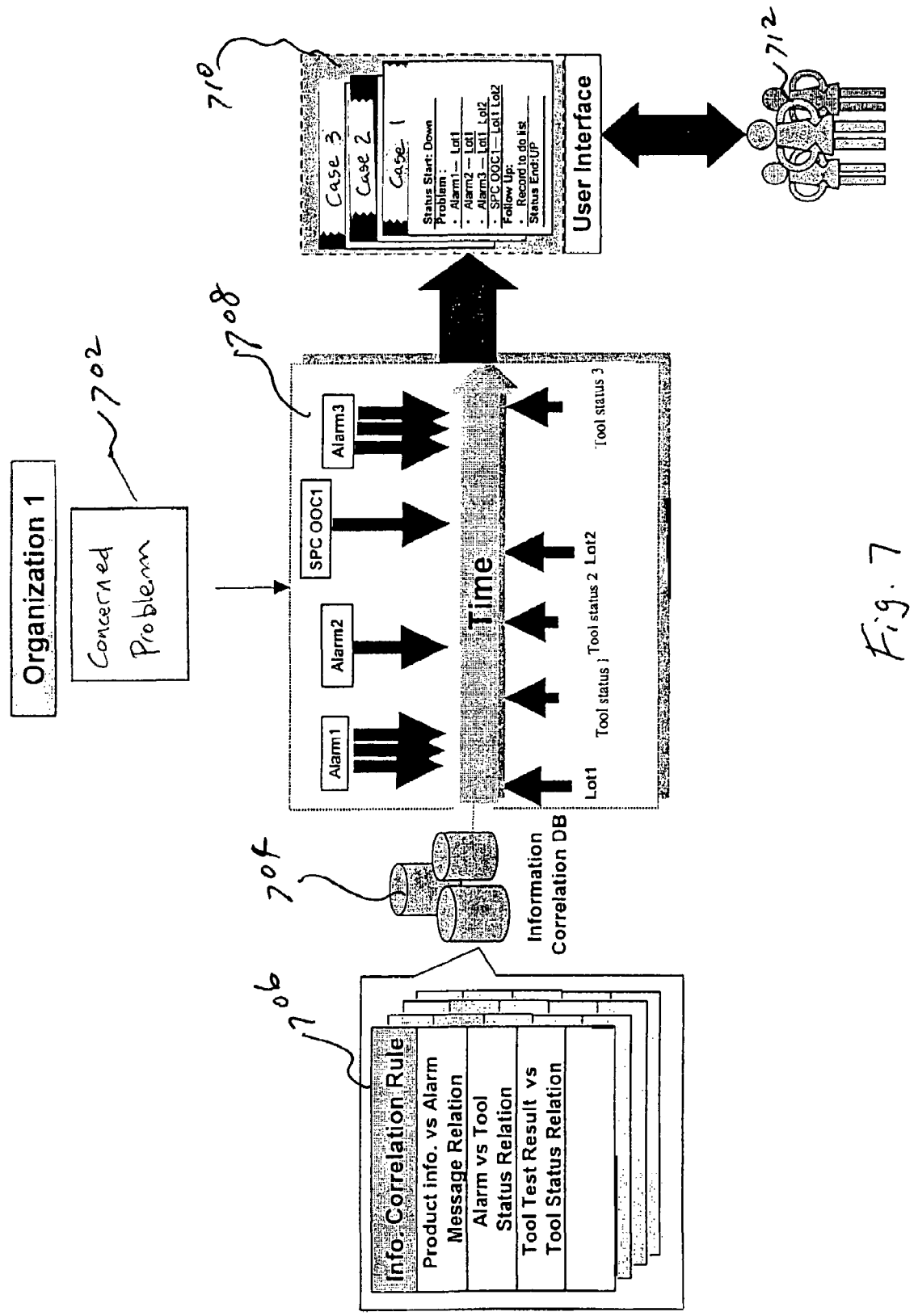
FIG. 7 is a flowchart of a method to correlate problem cases database.

Referring to FIG. 7 now, a method of correlation, performed by the system of FIG. 2 in one embodiment, is described. The concerned problem cases 702 extracted by the method of FIG. 6 would be further processed through correlation.

Information correlation database 704 includes all correlation rules. The correlation rules are preset and dynamically maintained. In one embodiment, each correlation rule would pick up two parameters and set criteria such as in what condition these two parameters are considered to be related to each other. One of example of the information correlation database is designated with numeral 706 which includes rules for pairs of parameters such as product information versus alarm message relation, alarm versus tool status relation, and tool test result versus tool status relation.

During correlation processing 708, selected parameters are processed according to the information correlation database. For example, alarm and lots information over time are provided, processed based on an alarm versus lots correlation rule. Each concerned case will be updated according to correlation process if there are any correlations. One example is shown in charts 710, where all relevant cases are listed with correlation information included, such as alarm 1, and alarm2 are related to lot1, alarm3 is related to lot1 and lot2, SPC OOC1 is related to lot1 and lot2. The above correlation information is presented to users 712.

Referring to FIG. 8, a method of tracking, performed by the system of FIG. 2 in one embodiment, is described. The correlated information 802 procured and presented by the method of FIG. 7 will be further processed for lifetime tracking and closing case. Case closing rule database 810 includes case closing rules. In one embodiment, the case closing rule database is preset and dynamically maintained. A case closing rule includes case closing criteria on which a case is evaluated to determine if it has enough tracked information to be closed. One example 812 of the case closing rule database includes case closing criteria such as tool status available, product yield in specification, follow up task finished, and shift changed. If a case meets these criteria, it may be considered for closing.

Operators or engineers in each shift will add tracking information 804 to the record of each case. Determine case life cycle 806 step is responsible for evaluation to determine if a case is ready to be closed. The tracking information will be evaluated by determine case life cycle step 806 according to case closing database 810. If a case is determined to be closed, its data and tracked information will be saved to a history database 808 for future reference. If it is determined not to be closed, the case will keep open for further following-up and tracking until it is ready for closing.

The present embodiments may have many different benefits. A problem case system and its database are built up continuously and dynamically. The acquisition and accumulation of case information is not scattered and isolated from engineer to engineer, from tool to tool, from fab to fab, from site to site, even from company to company. Instead, knowledge is commonly shared and is not interrupted by engineers changing employment and manufacturing changes. The accumulated database is maintained and updated over time.

The disclosed problem case system is usable for manufacturing problem solving, production yield improving, chip defect identification, failure mode analysis, teams coordination, tool maintenance, junior engineer training and tutoring, technology evaluation, communication between fabrication plants, information sharing, and manufacturing management.

The present invention has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A method of problem case packaging handling comprising:
    collecting manufacturing problem information from entities associated with fabrication of a semiconductor product; and
    distributing the manufacturing problem information into problem cases which are stored in a problem database, each problem case representing a respective manufacturing problem and having a tree structure that includes a plurality of different branches that represent respective different aspects of the corresponding problem case, each said branch being associated with manufacturing problem information related to that branch;
    wherein the tree structure of one of the problem cases, beginning at the root, is problem-process-tool-product.

2. The method of claim 1 wherein the manufacturing problem information includes problem source information.

3. The method of claim 1 wherein the manufacturing problem information includes process problems.

4. The method of claim 3, wherein each of the process problems is one of mis-processing, double processing, and cross processing by human error.

5. The method of claim 1 wherein the manufacturing problem information includes tool problems.

6. The method of claim 5, wherein each of the tool problems is one of a mechanical malfunction, an inconsistent processing result, and an out-of-specification processing parameter.

7. The method of claim 1 wherein the distribution step includes distributing the manufacturing problem information over respective organizations involved in manufacturing the semiconductor product.

8. The method of claim 1 further including prioritizing the distributed manufacturing problem information.

9. The method of claim 8, wherein the prioritizing includes prioritizing the distributed identified problems according to problem frequency.

10. The method of claim 8, wherein the prioritizing includes prioritizing the distributed identified problems according to criticality.

11. The method of claim 1 further including correlating first manufacturing problem information with second manufacturing problem information.

12. The method of claim 1 further including tracking a problem case over its lifetime.

13. The method of claim 1 wherein the manufacturing problem information includes product information regarding the particular product affected in a problem case.

14. The method of claim 1, wherein the manufacturing problem information includes a material problem selected from the group consisting of material contamination, an out-of-specification material, an incorrect type of material, supplier quality problem, a beyond-shelf-life material, a material degradation, and an out-of-storage-condition material.

15. A method of problem case packaging handling comprising:

collecting manufacturing problem information from entities associated with fabrication of a semiconductor product; and distributing the manufacturing problem information into problem cases which are stored in a problem database, each problem case representing a respective manufacturing problem and having a tree structure that includes a plurality of different branches that represent respective different aspects of the corresponding problem case, each said branch being associated with manufacturing problem information related to that branch;

wherein the tree structure of one of the problem cases, beginning at the root, is problem-tool-process-product.

16. The method of claim 15 wherein the manufacturing problem information includes product information regarding the particular product affected in a problem case.

17. A method of problem case packaging handling comprising:

collecting manufacturing problem information from entities associated with fabrication of a semiconductor product; and distributing the manufacturing problem information into problem cases which are stored in a problem database, each problem case representing a respective manufacturing problem and having a tree structure that includes a plurality of different branches that represent respective different aspects of the corresponding problem case, each said branch being associated with manufacturing problem information related to that branch;

wherein the tree structure of one of the problem cases, beginning at the root, is problem-product-process-tool.

18. The method of claim 17 wherein the manufacturing problem information comprises an element selected from the group consisting of tool alarm messages, tool status, product defects, out of specification (OOS) information, statistic process control (SPC) chart data, product processing information, product test results which include wafer acceptance test (WAT) results and wafer level reliability (WLR) test results, wafer scrapping data, yield data, yield mapping pattern and daily tool qualification information.

* * * * *